(12) United States Patent
Harvey

(10) Patent No.: US 6,435,142 B2
(45) Date of Patent: Aug. 20, 2002

(54) IN-TANK WATER CONTROL

(75) Inventor: Richard W. Harvey, Logansport, IN (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 0 days.

(21) Appl. No.: 09/765,009

(22) Filed: Jan. 18, 2001

Related U.S. Application Data
(60) Provisional application No. 60/176,790, filed on Jan. 18, 2000.

(51) Int. Cl.$^7$ .............................................. F02M 37/00
(52) U.S. Cl. ................................................... 123/25 R
(58) Field of Search ........................... 123/25 R, 25 A, 123/25 B, 25 C, 25 D, 25 E, 25 F, 497, 25 J, 25 L, 575, 510

(56) References Cited

U.S. PATENT DOCUMENTS 4,157,082 A  *  6/1979  Day ........................... 123/136
6,102,085 A  *  8/2000  Nanaji ........................ 141/83
6,234,148 B1  *  5/2001  Hartke et al. ................ 123/447

* cited by examiner

Primary Examiner—Marguerite McMahon
Assistant Examiner—Hyder Ali
(74) Attorney, Agent, or Firm—Baker & Daniels

(57) ABSTRACT

A system for transferring fuel from a fuel tank to an engine which allows an optimum water/fuel ratio (i.e., a ratio which will permit the engine to operate substantially normally while disposing of water in the fuel tank) to be transferred to the engine. The apparatus includes a fuel pump having two inlets in fluid communication with the vehicle fuel tank. A hydrophobic filter is associated with one of the inlets and is operative to prohibit water from entering the fuel pump. The inlets are sized to achieve an optimum water/fuel ratio for delivery to an internal combustion engine. In one exemplary embodiment, an adjustable orifice may be associated with the second inlet, such that the water content of the product transferred to the engine may be regulated depending on, e.g., the operational state of the engine.

30 Claims, 3 Drawing Sheets

IN-TANK WATER CONTROL

CROSS-REFERENCE TO RELATED APPLICATION

This application is related to and claims the benefit under 35 U.S.C. § 119 (e) of United States Provisional Application Serial No. 60/176,790 filed Jan. 18, 2000.

BACKGROUND OF THE INVENTION

1. Field of the Invention

The present invention relates to fuel transfer from a fuel tank to an engine and, more particularly, to a method and apparatus for allowing an optimum amount of water to be transferred with fuel to the engine, wherein the optimum amount of water is an amount of water which will permit the engine to operate substantially normally while disposing of water in the fuel tank.

2. Description of the Related Art

Hydrocarbon fuels are typically utilized in, for example, automobiles, trucks, boats, and other water craft. Hydrocarbon fuels are generally transported to a typical fueling station utilizing transport trucks which carry the fuel from a refinery or storage facility to the fueling station. Fueling trucks are typically compartmentalized so that different grades of fuel may be simultaneously transported to a fuel filling station. The fuel filling station measures the amounts of particular fuel grades needed to bring its storage tanks to full and communicates this information to, for example, the fuel storage facility. Transport trucks are filled and dispatched accordingly.

Typically, many of the individual compartments of the fuel transfer truck will not be filled to capacity and will therefore contain air-filled space. As the air in the transport truck compartments cools, condensation is formed. Moisture accumulates and mixes with the fuel contained within the compartments. The thusly diluted and contaminated fuel is then deposited at a fueling station and subsequently pumped directly into a vehicle, or pumped into a transport container for later transfer into a remotely located vehicle or water craft.

Vehicle and water craft fuel tanks are, of course, not always filled to capacity. As in transport trucks, condensation forms in partially filled fuel tanks and further contaminates the fuel contained therein. Water condensation and subsequent contamination of fuel has been described with respect to fuel transport trucks and individual fuel tanks by way of example. Condensation and subsequent contamination can occur in any partially empty reservoir and is particularly problematic in large reservoirs with large amounts of air-filled space.

In addition to water contamination caused by condensation, water craft are susceptible to additional fuel contamination due to the operational environment of such craft. Water craft are typically fueled while in the water and, therefore, water may be splashed into or otherwise inadvertently introduced into the fuel tank while fueling. Additionally, water craft typically occupy areas of high humidity, which exacerbates the problem of water contamination due to condensation forming in the tanks.

Additional problems of fuel contamination are associated with small jet powered water craft or "personal water craft". Personal water craft (PWC) are often used by individuals to execute sharp turns at high speeds as well as other maneuvers which may lead to increased occurrences of the PWC being capsized. When capsized, fuel storage and distribution parts of a water craft can be more susceptible to infiltration by water.

Water contaminated fuel can be the cause of many engine problems. Water contaminated fuel can cause rough engine operation, and loss of engine power. Problem frequency and severity increases as the water/fuel ratio increases. A high water/fuel ratio is particularly problematic at engine start. Water settles to the bottom of the fuel tank when the vehicle is at rest and therefore the "fuel" drawn into the engine has a very high water content. While water contaminated fuel may cause the above-mentioned problems, a certain amount of water can be run through an internal combustion engine without experiencing these problems, particularly at high engine speeds.

Generally, fuel pumps utilized in land vehicles and water craft either pump the entire water content of the fuel tank to the engine or filter substantially all the water from the fuel tank. Significant amounts of water accumulate when utilizing a system allowing substantially no water to reach the engine of a land vehicle or water craft. This accumulated water must be stored for later removal from the vehicle.

In view of the above-identified problems, systems which seek to allow a measured portion of water to reach the engine have been developed. One such system utilizes a fuel supply tank having a pair of outlets which combine at a single fluid conduit which is in direct fluid communication with a fuel pump. One of the supply tank outlets is situated at the lowermost region of the supply tank, such that water accumulating therein is continuously delivered to the fuel pump. The outlet connected to the lowermost region of the supply tank includes a flow restriction device to attempt to limit the quantity of water supplied to the fuel pump. The other of the supply tank outlets is positioned above the lowermost region of the supply tank in an effort to prevent water accumulated in the supply tank from being conducted by this outlet to the fuel pump. This system does not utilize a hydrophobic filter, and, therefore, hydrocarbon product containing a water component may be transferred via either fluid conduit exiting the fuel tank. With this in mind, this prior art fuel supply system will supply product to the fuel pump having an imprecise water/fuel ratio, which may be greater than the optimum water/fuel ratio.

The water/fuel ratio of the product provided by the system described immediately supra is susceptible to increase due to fuel sloshing. Since the amount of water delivered to the fuel pump is dependent solely on the location of the fluid conduits, if the contents of the fuel supply tank are sloshed and jostled, all of the water in the supply tank will not be contained in the lowermost region of the tank. Therefore, the conduit connected above the lowermost region of the fuel tank will many times deliver water-contaminated fuel to the fuel pump in addition to the water conveyed by the conduit connected to the lowermost region of the tank. Since this system does not utilize a hydrophobic filter to prevent water from being conducted by one of the fluid conduits exiting the fuel tank, a large amount of water could make its way to the engine. Therefore, this fuel supply system cannot consistently deliver the optimum amount of water to the engine, and thus any engine to which it is connected would be susceptible to the problems associated with water contaminated fuel.

Other systems which seek to allow a measured portion of water to reach an engine utilize complex devices. Such devices, for example, utilize dual fuel pumps and separation membranes. Other known devices utilize a venturi tube including a plurality of ports through which water may pass to introduce a measured amount of water to the fuel feed system. The water/fuel ratio provided by a delivery system utilizing a ported venturi tube is dependent solely upon the rate of fluid transfer. These systems will transfer water to an engine only at relatively high rates of fluid flow. Since systems utilizing ported venturi tubes will not transfer water to the engine at relatively slow operating speeds, these systems may experience water accumulation.

What is needed in the art is a method and apparatus for eliminating engine problems associated with water contaminated fuel while allowing an optimum amount of water to be run through the engine and avoiding water accumulation in the fuel tank.

SUMMARY OF THE INVENTION

The present invention is directed to improve upon existing methods and apparatus for transferring fuel from a fuel tank to an internal combustion engine, wherein it is desired to achieve an optimum water/fuel ratio to be run through the engine, and wherein the optimum water/fuel ratio corresponds to a water/fuel ratio which will permit the engine to operate substantially normally while disposing of water in the fuel tank. The optimum water/fuel ratio can be empirically determined for specific applications and will vary depending upon the operational condition of the engine.

The invention, in one form thereof, comprises a fuel transfer apparatus for conveying fuel from a fuel tank to an engine. In this form of the current invention a fuel pump having a pair of inlets is placed in fluid communication with both the fuel tank and the engine. A filter operable to prevent water from flowing therethrough is positioned upstream from one of the pair of fuel pump inlets. The pair of fuel pump inlets are relatively sized to achieve a water/fuel ratio which allows an amount of water to reach the engine, whereby the water reaching the engine has substantially no adverse effect on the operation of the engine.

The invention, in another form thereof, comprises a fuel transfer apparatus for conveying fuel from a fuel tank to an engine. The fuel transfer apparatus of this form of the current invention includes a fuel pump having inlet means placed in fluid communication with both the fuel tank and the engine. The apparatus of this form of the current invention utilizes filter means for preventing water from flowing through a first portion of the inlets means to achieve a water/fuel ratio allowing an amount of water to reach the engine. The amount of water reaching the engine has substantially no adverse effect on engine performance.

The invention, in another form thereof, comprises a method of conveying fuel from a fuel tank to an engine. The method of this form of the current invention includes the steps of: providing a fuel conveying device having a first inlet operable to prevent water from entering the fuel conveying device and a second inlet which allows water to enter the fuel conveying device; sizing the first inlet and the second inlet to achieve a water/fuel ratio, whereby said water/fuel ratio allows an amount of water to reach the engine, which amount of water has substantially no adverse effect on engine performance; placing the first and the second inlets in fluid communication with the fuel tank; and placing the outlet of the fuel conveying device in fluid communication with the engine.

Additional forms of the current invention include a controllably sized orifice associated with one or both of the fuel pump inlets so that the water/fuel ratio can be readily adjusted. For example, a controllably sized orifice may be operatively connected to the fuel pump inlet allowing water contaminated fuel to pass therethrough. In these embodiments, the size of this orifice can advantageously be changed depending upon, e.g., the operational state of the engine or the water content of the fuel tank. For example, the orifice size could be significantly reduced at engine start-up and enlarged as the engine achieves relatively high running speeds. In one exemplary embodiment, the controllably sized orifice is connected to and controlled by a computational/control device, e.g., a programmable logic controller or a microprocessor.

In one form of the current invention, the fuel pump inlet downstream from the hydrophobic filter is configured to access fuel maintaining a higher position in the fuel tank relative to the fuel which is accessible to the fuel pump inlet allowing water to pass to the engine. Since water settles to the bottom of a fuel tank, this configuration allows the water content of the fuel tank easier access to the non-water filtered fuel pump inlet.

An advantage of the present invention is the ability to eliminate problems associated with fuel having a high water/fuel ratio running through an internal combustion engine.

Another advantage of the present invention is the ability to eliminate problems associated with water contaminated fuel without requiring provision of a water storage facility and the periodic emptying thereof.

A further advantage of the present invention is the ability to allow water to be run through an internal combustion engine during all operational states of the engine, while eliminating the problems associated with running water contaminated fuel through an internal combustion engine.

Yet another advantage of the present invention is the ability to prevent product having an overly high water/fuel ratio from being introduced into an internal combustion engine.

BRIEF DESCRIPTION OF THE DRAWINGS

The above-mentioned and other features and advantages of this invention, and the manner of attaining them, will become more apparent and the invention itself will be better understood by reference to the following description of an embodiment of the invention taken in conjunction with the accompanying drawings, wherein.

Corresponding reference characters indicate corresponding parts throughout the several views. The exemplification set out herein illustrates preferred embodiments of the invention, and such exemplification is not to be construed as limiting the scope of the invention in any manner.

DETAILED DESCRIPTION OF THE INVENTION

Figure 1:
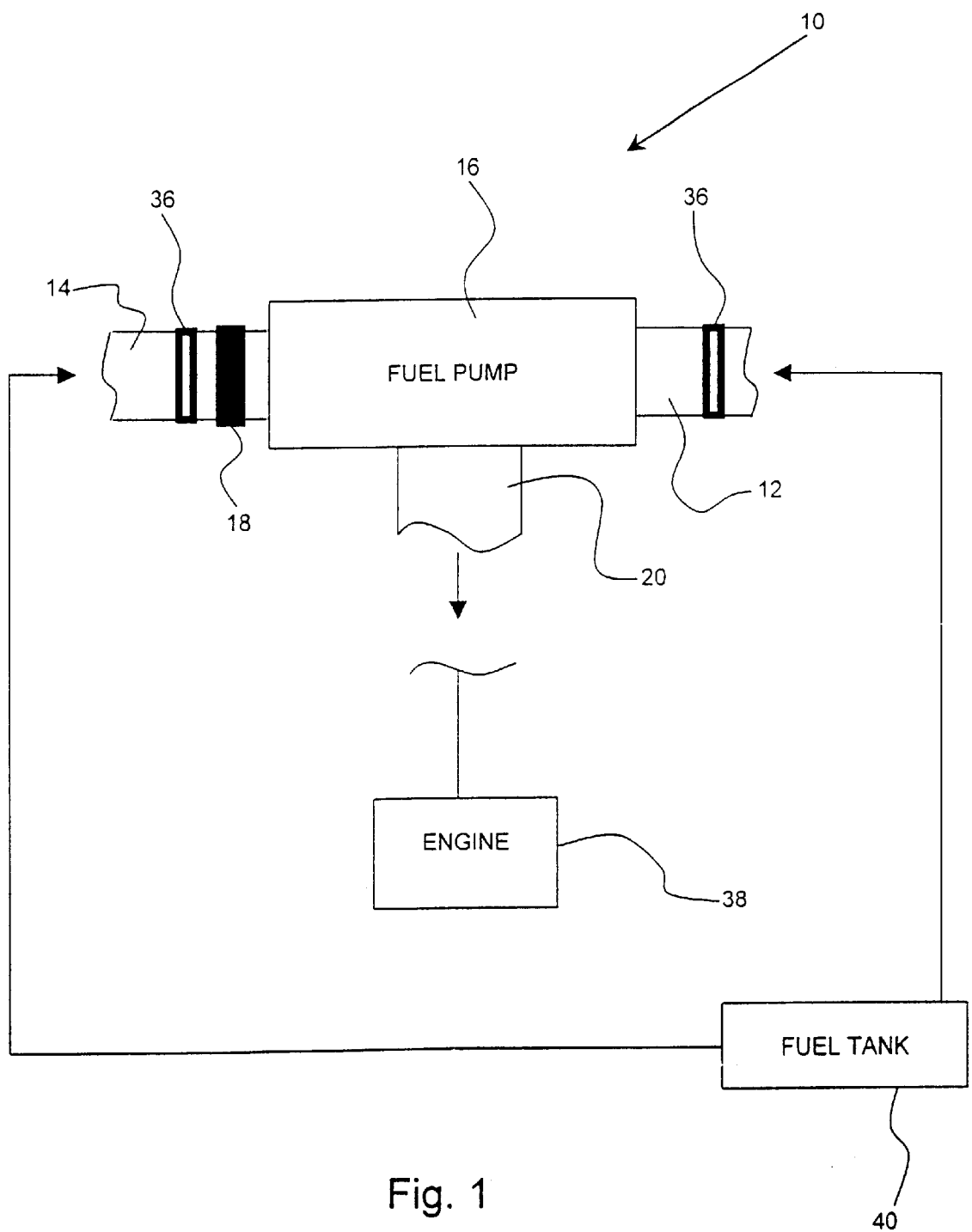
FIG. 1 is a schematic representation of an embodiment of the fuel transfer apparatus of the current invention.

Referring now to the drawings and particularly to FIG. 1, there is shown fuel transfer apparatus 10 including first inlet 14, second inlet 12, filter 18, and fuel pump 16. Fuel pump 16 is in fluid communication with first inlet 14, second inlet 12, engine 38, and fuel tank 40 (by way of first inlet 14 and second inlet 12). Filter 18 is operative to prevent water from reaching fuel pump 16 through first inlet 14. First inlet 14 and second inlet 12 are sized to achieve an optimum water/fuel ratio (i.e., a water/fuel ratio which will permit the engine to operate substantially normally while disposing of water in the fuel tank) to be transferred to engine 38 by fuel pump 16.

Figure 2:
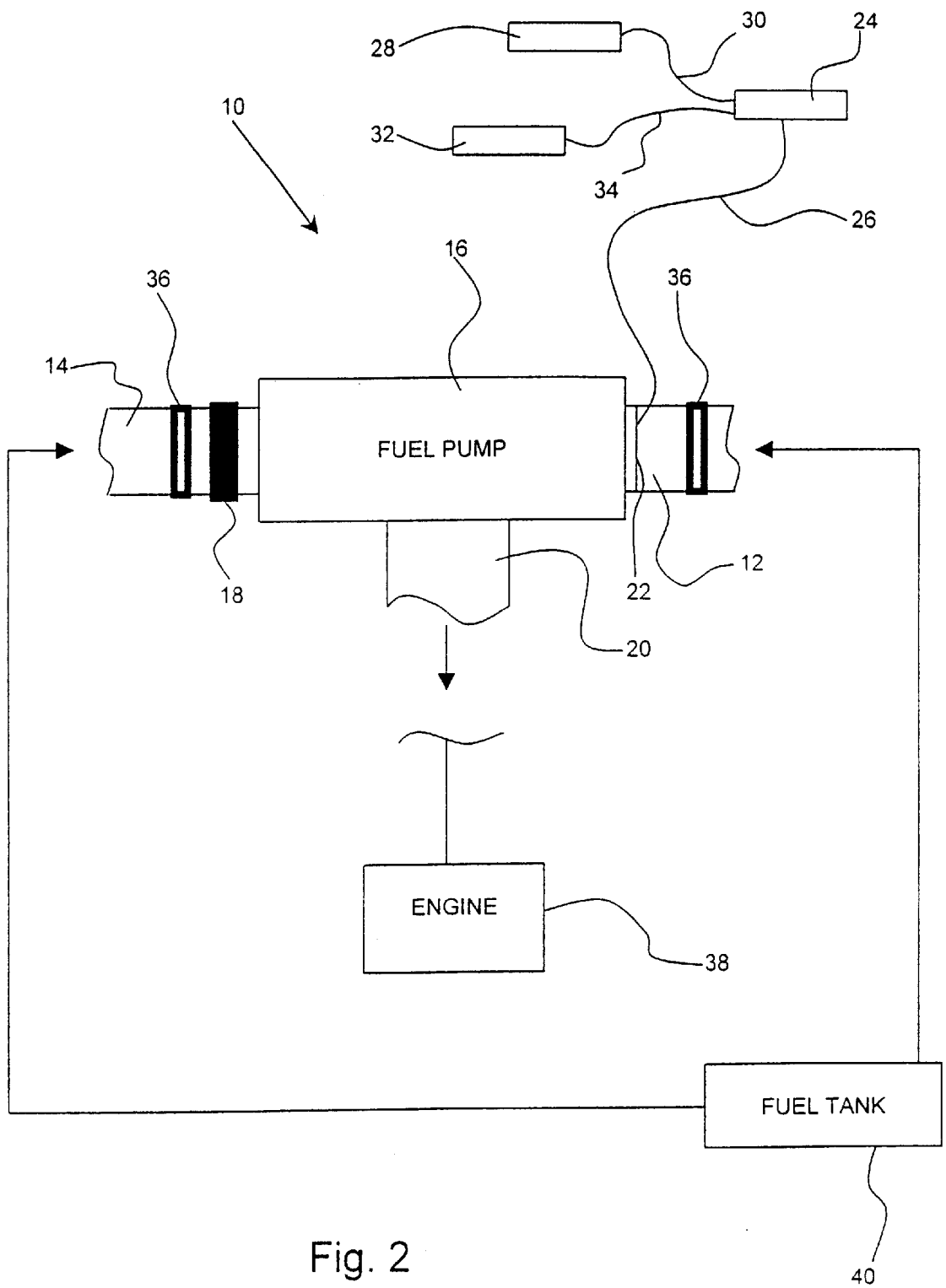
FIG. 2 is a schematic representation of another embodiment of the fuel transfer apparatus of the current invention.

FIG. 2 illustrates another embodiment of the present invention. As illustrated, fuel pump 16 is in direct fluid communication with first inlet 14, second inlet 12 and outlet 20. Fuel pump 16 is operative to draw fuel from fuel tank 40 through first inlet 14 and second inlet 12 and to transfer fuel to engine 38 via outlet 20. As in the embodiment illustrated in FIG. 1, filter 18 is operative to prevent water from entering fuel pump 16 through first inlet 14. In one exemplary embodiment, filter 18 is a hydrophobic filter. As is known in the art, debris filters 36 are utilized to eliminate dirt and other debris from reaching the fuel pump and consequently the engine. Debris filters 36 are utilized with respect to both first inlet 14 and second inlet 12.

As illustrated in FIG. 2, adjustable orifice 22 is operative to regulate the amount of fluid flow through second inlet 12. Adjustable orifice 22 can be any type of adjustably sized orifice known in the art. Adjustable orifice 22 is communicatively connected to adjustable orifice control unit 24 via communication line 26. Adjustable orifice control unit 24 is further communicatively connected to engine speed sensor 28 and water sensor 32 via communication lines 30, 34, respectively. Adjustable orifice control unit 24 is operable to control the orifice size of second inlet 12 and therefore to control the water content of the fuel exiting fuel pump 16 via outlet 20.

Adjustable orifice control unit 24 can be, for example, a microprocessor or a programmable logic controller. Adjustable orifice control unit 24 can be pre-programmed to signal changes in orifice size associated with certain engine operational parameters. For example, adjustable orifice control unit 24 may be programmed to substantially close adjustable orifice 22 at engine start. In this way, the water/fuel ratio at engine start can be decreased, or substantially eliminated, thus allowing for relatively easy engine start. As engine speed increases, a higher water/fuel ratio may be run through the engine without adversely impacting engine performance. With this in mind, adjustable orifice control unit 24 may further be programmed to increase or decrease the size of adjustable orifice 22 based upon engine running speed as sensed by engine speed sensor 28. Adjustable orifice control unit 24 may further be programmed to decrease the size of adjustable orifice 22 based upon water content in the fuel tank (not shown) as sensed by water sensor 32.

In operation, first inlet 12 and second inlet 14 are sized to achieve the optimum water/fuel ratio for a particular engine and/or engine operating condition. In the embodiment illustrated in FIG. 2, the water/fuel ratio is variable as a function of one or more operating parameters. The water contained in the fuel tank of a land vehicle or water craft may thus be efficiently eliminated without requiring a storage area for filtered water and consequent emptying of such a storage area. Sizing of adjustable orifice 22 allows for real time adjustment of the water/fuel ratio and therefore continuous optimum water elimination from the fuel tank.

As mentioned above, the optimum water/fuel ratio can be empirically determined for specific applications. For example, FIG. 3 graphically depicts the effects of water ingestion on the output of an Indmar V-8 engine. To determine the effects of water ingestion on this engine, a test engine was connected to a SUPERFLOW SF-901 dynamometer. Fuel and water were mixed in the test fuel tank in known quantities. Ninety-two octane fuel was utilized for the purpose of this test, and the percentages of water in the fuel tank ranged from 1% –50% of the total volume of the mixture. The engine was run from 3,000 to 4,000 rpm at wide open throttle in 500 rpm increments, while power output was measured by the dynamometer. Each step in the test was maintained for thirty seconds to ensure that the engine achieved a steady state condition. When the test was complete, the remaining mixture of water and fuel in the fuel tank was drained and measured to determine the amount of each component that remained. These figures were utilized to calculate the average percentage of water ingested by the engine during the test run. The test results are tabulated below.

TABLE 1

Calculated values of water intake and changes in power

| Trial | Total Intake, mL | Water Intake, mL | % H2O by Vol. | Δ AVG Torque | % diff, torque | Δ AVG HP | % diff, HP |
|---|---|---|---|---|---|---|---|
| 1 | 1730 | 10 | 0.6% | −8.3 lb-ft | −2.5% | −2.5 | −3.3% |
| 2 | 1270 | 15 | 1.2% | 5.9 lb-ft | 1 7% | 3 | 2 6% |
| 3 | 1250 | 40 | 3.2% | 14.25 lb-ft | 42% | 9.1 | 4 0% |
| 4 | 1160 | 80 | 6 9% | −7.9 lb-ft | −3.2% | −5.9 | −3.3% |
| 5 | 1590 | 120 | 7.5% | −28.5 lb-ft | −8.5% | −21.6 | −9.3% |
| 6 | 1250 | 190 | 15.2% | −74.8 lb-ft | −22.2% | −53.3 | −23.0% |
| 7 | 1000 | 175 | 17.5% | −88.7 lb-ft | −26.4% | −60.7 | −27.0% |
| 8 | 1130 | 500 | 44.2% | −251 lb-ft | −75.4% | −152 | −75.3% |

Figure 3:
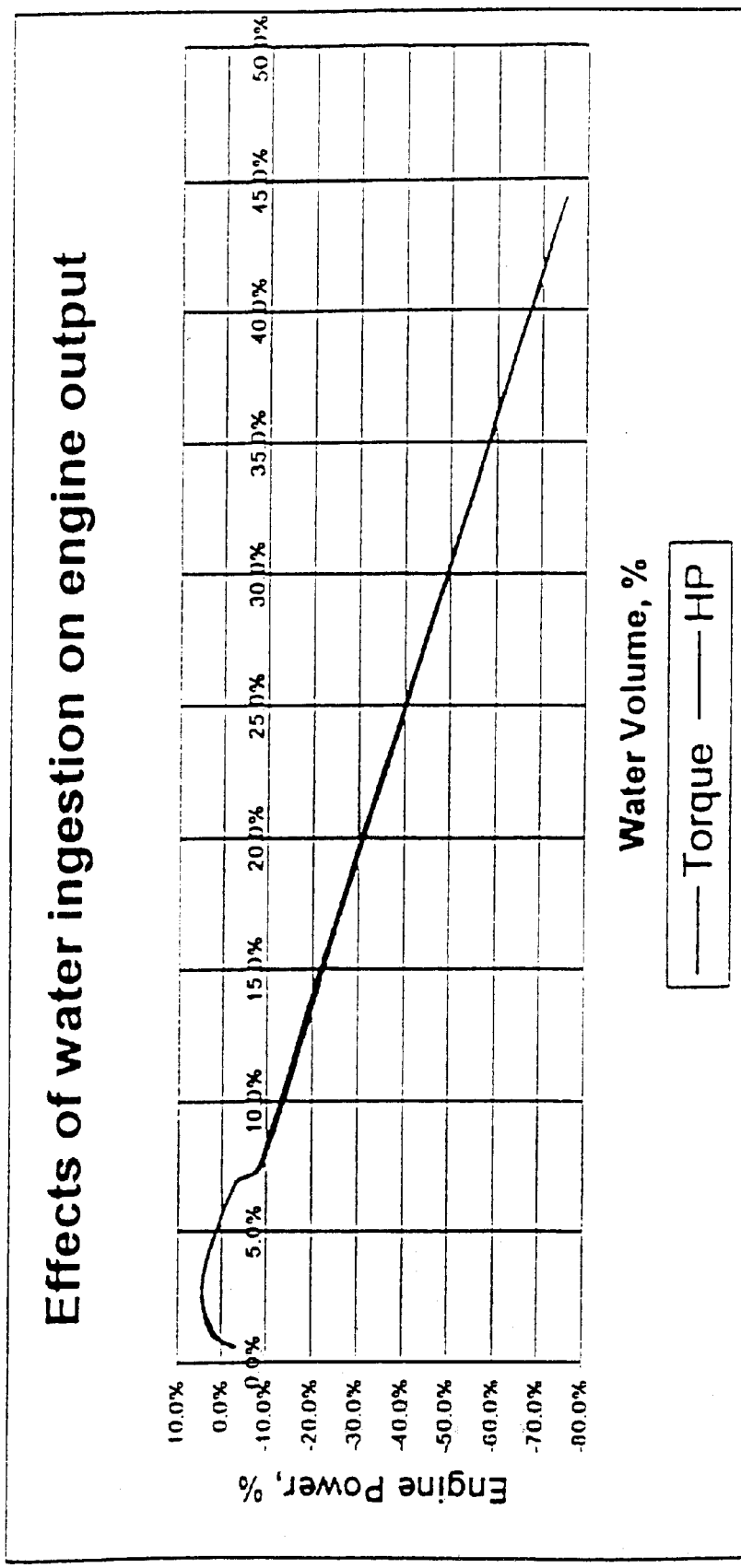
FIG. 3 is a graphical depiction of the effects of water ingestion on engine output for a particular test engine.

As illustrated by the results tabulated above and graphically depicted in FIG. 3, the best result for the test engine occurred when approximately 3% of water by volume was transferred with fuel to the engine. The optimum amount of water for the test engine described above is in the range of 0 to 5% of water by volume.

While this invention has been described as having preferred designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A fuel transfer apparatus for conveying fuel from a fuel tank to an engine, said fuel tank including both fuel and water, said apparatus comprising:
   a fuel pump having a pair of inlets in fluid communication with the fuel tank and with the engine; and
   a filter connected in fluid communication with and upstream from a first one of said inlets, said filter preventing water from flowing through said first inlet;
   wherein said pair of inlets are sized relative to each other to achieve a water/fuel ratio allowing an amount of water to reach the engine, said amount of water having substantially no adverse effect on engine performance.

2. The fuel transfer apparatus of claim 1, wherein said filter is a hydrophobic filter.

3. The fuel transfer apparatus of claim 1, further comprising a pair of debris filters for preventing dirt and other debris from reaching the fuel pump, wherein each of said debris filters is in fluid communication with and upstream from one of said inlets.

4. The fuel transfer apparatus of claim 1, further comprising an adjustably sized orifice in fluid communication with a second one of said inlets, said orifice positioned upstream from said fuel pump, wherein said orifice is operable to alter said amount of water.

5. The fuel transfer apparatus of claim 4, further comprising an adjustable orifice control unit communicatively connected to said orifice, wherein said control unit is operable to control said adjustably sized orifice based on an operating parameter and thereby alter said amount of water.

6. The fuel transfer apparatus of claim 5, wherein said adjustable orifice control unit comprises a microprocessor operable to control said adjustably sized orifice.

7. The fuel transfer apparatus of claim 5, further comprising an engine speed sensor communicatively connected to said adjustable orifice control unit and operable to sense a value of engine speed, and wherein said operating parameter comprises said value of engine speed.

8. The fuel transfer apparatus of claim 5, further comprising a water sensor communicatively connected to said adjustable orifice control unit and operable to sense a value of water content in the fuel tank, and wherein said operating parameter comprises said valve of water content.

9. The fuel transfer apparatus of claim 1, wherein said water/fuel ratio comprises about 3% by volume.

10. The fuel transfer apparatus of claim 1, wherein said water/fuel ratio is about 5% or less by volume.

11. A fuel transfer apparatus for conveying fuel from a fuel tank to an engine, said fuel tank including both fuel and water, said apparatus comprising:

a fuel pump having inlet means for achieving a water/fuel ratio, said inlet means in fluid communication with the fuel tank and the engine, whereby said water/fuel ratio allows an amount of water to reach the engine, said amount of water having substantially no adverse effect on engine performance; and filter means for preventing water from flowing through a first portion of said inlet means.

12. The fuel transfer apparatus of claim 11, wherein said filter means comprises a hydrophobic filter.

13. The fuel transfer apparatus of claim 11, wherein said inlet means comprises a pair of inlets.

14. The fuel transfer apparatus of claim 11, further comprising debris filter means for preventing dirt and other debris from reaching the fuel pump, wherein said debris filter means is in fluid communication with and upstream from said inlet means.

15. The fuel transfer apparatus of claim 11, further comprising restriction means for restricting fluid flow through a second portion of said inlet means, said second portion of said inlet means allowing water to pass therethrough wherein said restriction means is operable to alter said amount of water.

16. The fuel transfer apparatus of claim 15, wherein said restriction means comprises an adjustably sized orifice in fluid communication with said second portion of said inlet means.

17. The fuel transfer apparatus of claim 16, further comprising control means for controlling said adjustably sized orifice based on an operating parameter, and thereby altering said amount of water.

18. The fuel transfer apparatus of claim 17, wherein said control means comprises a programmable logic controller.

19. The fuel transfer apparatus of claim 17, further comprising speed sensing means for sensing a value of engine speed, and wherein said operating parameter comprises said value of engine speed.

20. The fuel transfer apparatus of claim 17, further comprising water sensing means for sensing a value of water content in the fuel tank, and wherein said operating parameter comprises said value of water content.

21. The fuel transfer apparatus of claim 11, wherein said water/fuel ratio comprises about 3% by volume.

22. The fuel transfer apparatus of claim 11, wherein said water/fuel ratio is about 5% or less by volume.

23. A method of conveying fuel from a fuel tank to an engine, comprising:

providing a fuel conveying device having a first inlet operable to prevent water from entering said fuel conveying device and a second inlet allowing water to enter said fuel conveying device;

sizing said first inlet and said second inlet to achieve water/fuel ratio, whereby said water/fuel ratio allows an amount of water to reach the engine, said amount of water having substantially no adverse effect on engine performance;

placing said first and said second inlets in fluid communication with the fuel tank; and placing the outlet of the fuel conveying device in fluid communication with the engine.

24. The method of conveying fuel from a fuel tank to an engine, as recited in claim 23, wherein said step of providing a fuel conveying device comprises providing a fuel pump.

25. The method of conveying fuel from a fuel tank to an engine, as recited in claim 24, further comprising:

providing a pair of debris filters for preventing dirt and other debris from reaching the fuel pump; and placing one of said debris filters in fluid communication with each of said first and said second inlets upstream of said fuel conveying device.

26. The method of conveying fuel from a fuel tank to an engine, as recited in claim 23, further comprising:

providing an adjustably sized orifice;

placing said adjustably sized orifice in fluid communication of said second inlet; and sizing said adjustably sized orifice to adjust said water/fuel ratio based on an operating parameter.

27. The method of conveying fuel from a fuel tank to an engine, as recited in claim 26, further comprising:

providing an adjustable orifice control unit;

communicatively connecting said adjustable orifice control unit to said adjustably sized orifice; and controlling said adjustably sized orifice with said adjustable orifice control unit based on said operating parameter.

28. The method of conveying fuel from a fuel tank to an engine, as recited in claim 23, wherein said step of providing a fuel conveying device having a first inlet operable to prevent water from entering said fuel conveying device, and a second inlet allowing water to enter said fuel conveying device comprises providing a fuel conveying device having a first inlet in fluid communication with a hydrophobic filter positioned upstream from said fuel conveying device and a second inlet allowing water to enter said fuel conveying device.

29. The method of conveying fuel from a fuel tank to an engine, as recited in claim 27, further comprising:

providing an engine speed sensor operable to sense a value of engine speed; and communicatively connecting said engine speed sensor to said adjustable orifice control unit;

wherein said operating parameter comprises said value of engine speed.

30. The method of conveying fuel from a fuel tank to an engine, as recited in claim 27, further comprising:

providing a water sensor operable to sense a value of water content in the fuel tank; and communicatively connecting said water sensor to said adjustable orifice control unit;

wherein said operating parameter comprises said value of water content.

* * * * *